United States Patent

Hwa et al.

[11] Patent Number: 5,176,849
[45] Date of Patent: Jan. 5, 1993

[54] COMPOSITION AND METHOD FOR SCAVENGING OXYGEN

[75] Inventors: Chih M. Hwa, Palatine; Dionisio G. Cuisia, Buffalo Grove, both of Ill.; Ronald L. Oleka, Oakville, Canada

[73] Assignee: W. R. Grace & Co.-Conn., New York, N.Y.

[21] Appl. No.: 868,434

[22] Filed: Apr. 15, 1992

[51] Int. Cl.$^5$ .............................. C23F 11/14
[52] U.S. Cl. ........................ 252/392; 422/16; 252/188.28
[58] Field of Search ............ 252/188.28, 181.1, 392; 422/16

[56] References Cited

U.S. PATENT DOCUMENTS

| | | | |
|---|---|---|---|
| 4,067,690 | 1/1978 | Cuisia et al. | 252/392 X |
| 4,350,606 | 9/1982 | Cuisia et al. | 252/392 |
| 4,689,201 | 8/1987 | Longworth et al. | 422/16 |
| 4,847,001 | 7/1989 | Cuisia et al. | 252/389.62 |
| 5,091,108 | 2/1992 | Harder et al. | 252/188.28 |
| 5,094,814 | 3/1992 | Soderquist et al. | 422/16 |

Primary Examiner—Robert L. Stoll
Assistant Examiner—Valerie D. Fee
Attorney, Agent, or Firm—James P. Barr

[57] ABSTRACT

A composition and method of inhibiting corrosion in boiler-steam condensate systems comprising adding to the system N,N-dihydrocarbylhydroxylamine and N-hydrocarbylhydroxylamine in amounts effective to inhibit corrosion.

10 Claims, 1 Drawing Sheet 5,176,849

COMPOSITION AND METHOD FOR SCAVENGING OXYGEN

FIELD OF THE INVENTION

The present invention relates to a method of inhibiting corrosion in boiler water systems and more particularly to compositions and methods for scavenging oxygen in both low temperature and high temperature areas in boiler-steam condensate systems.

BACKGROUND OF THE INVENTION

In steam generating systems, boiler water systems, steam lines, steam condensate lines, and the like, hereinafter referred to as boiler-steam condensate systems, one objective of a water treatment program is the removal of dissolved oxygen from the feedwater. The removal may be partially accomplished by using either Vacuum or thermal deaeration techniques or both. However, since complete oxygen removal cannot be effected by these techniques, further removal through the use of chemical oxygen scavenging agents has been a customary practice.

Sodium sulfite and hydrazine have commonly been used for scavenging oxygen in boilers, hot water plants, etc. However, the use of sodium sulfite introduces solids into the boiler water and hydrazine is a suspect carcinogen. In addition, these chemicals are not volatile and therefore are not effective in scavenging oxygen in steam and steam condensate lines.

Hydroxylamines and certain derivatives thereof are not only effective oxygen scavengers, but are also volatile, and have been used to control corrosion of iron and steel surfaces in boiler apparatus caused by dissolved oxygen. However, in boiler-steam condensate systems, there exist not only high temperature areas such as the boiler proper and steam lines but also low temperature areas such as boiler feedwater lines. The use of hydroxylamines has not been entirely effective for treating all areas of boiler-steam condensate systems.

SUMMARY OF THE INVENTION

Figure 1:
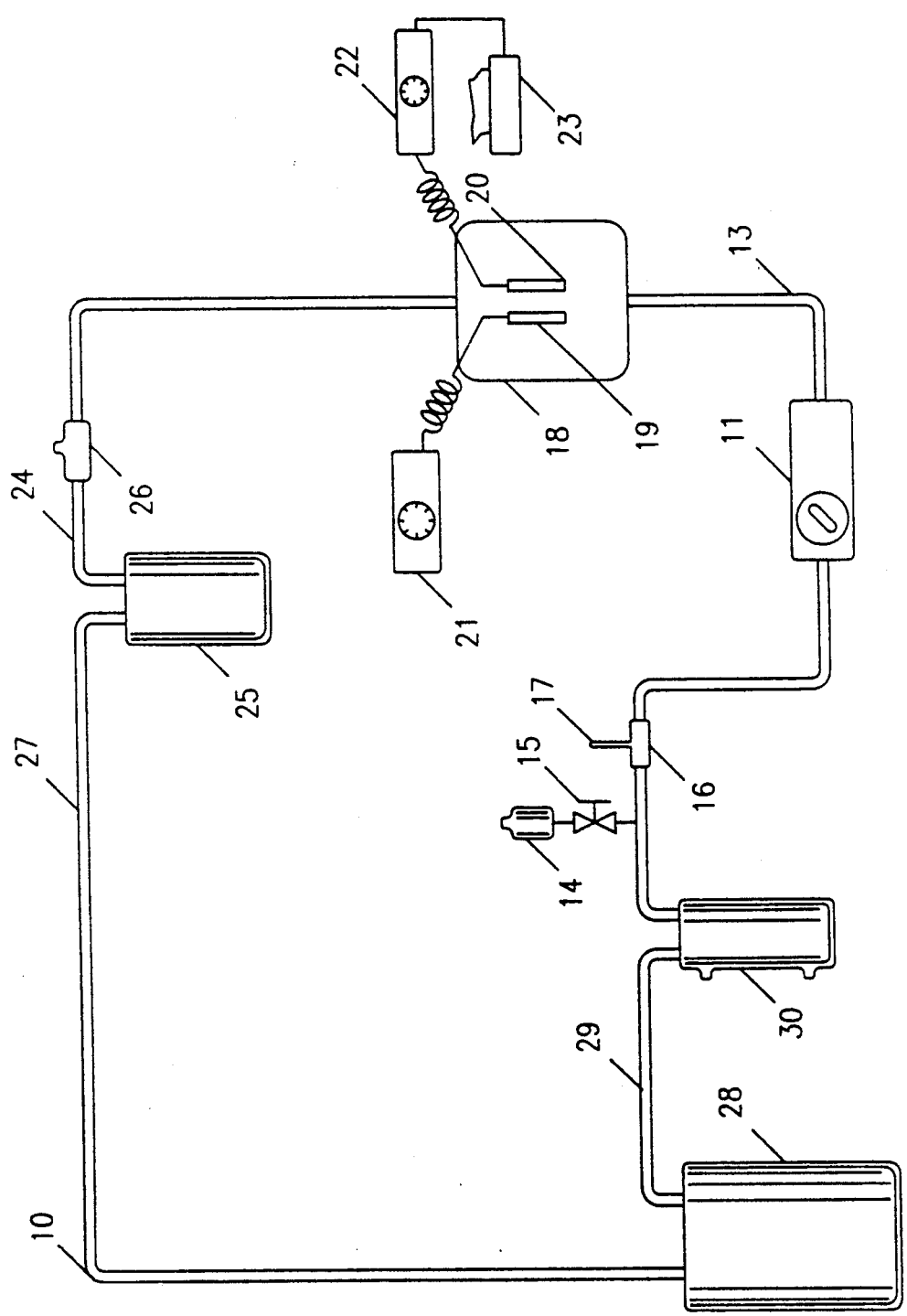
FIG. 1 is a schematic diagram of an apparatus which is useful for evaluating oxygen scavenging activity in a boiler-steam condensate system.

It is an objective of this invention to provide a method for inhibiting corrosion in boiler-steam condensate systems due to the presence of dissolved oxygen in the systems.

It is another objective of this invention to provide novel corrosion inhibiting compositions for use in boiler-steam condensate systems.

In accordance with the provisions of the present invention there have been provided certain novel corrosion inhibiting compositions comprising the combination of N,N-dihydrocarbylhydroxylamine and N-hydrocarbylhydroxylamine.

Also, in accordance with the present invention, there has been provided a method for inhibiting corrosion in boiler-steam condensate systems which comprises adding to the system at least one water-soluble N,N-dihydrocarbylhydroxylamine and at least one water-soluble N-hydrocarbylhydroxylamine in amounts effective to inhibit corrosion.

DETAILED DESCRIPTION

The present invention is directed to the control and inhibition of corrosion caused by the presence of dissolved oxygen in boiler-steam condensate systems. It has now been found that the combination of N,N-dihydrocarbylhydroxylamine and N-hydrocarbylhydroxylamine provide surprisingly enhanced oxygen scavenging effects.

As used herein, the terminology hydrocarbyl refers to $C_1$ and $C_{12}$ alkyl, homocycloalkyl or aromatic compounds such as benzyl, phenyl, or tolyl, preferably $C_1$ to $C_4$ alkyl compounds.

It has now been found that N,N-dihydrocarbylhydroxylamine and N-hydrocarbylhydroxylamine have unexpectedly different chemical and physical characteristics. For example, N,N-dihydrocarbylhydroxylamines such as N,N-diethylhydroxylamine react with oxygen rather slowly at low temperatures, but possess good stability at high temperatures. In contrast, N-hydrocarbylhydroxylamines such as N-isopropylhydroxylamine are fast reacting at low temperatures, but have relatively low thermal stability.

In boiler-steam condensate systems, there exist low temperature areas such as boiler feedwater lines as well as high temperature areas such as the boiler proper and steam lines. The use of either N,N-dihydrocarbylhydroxylamines or N-hydrocarbylhydroxylamines alone have not been completely satisfactory. It has now been discovered that these difficulties can be overcome by the use of a mixture of N,N-dihydrocarbylhydroxylamine and N-hydrocarbylhydroxylamine to provide enhanced oxygen scavenging activity in all areas of a boiler-steam condensate system.

Specific examples of N,N-dihydrocarbylhydroxylamines suitable for use in this invention include, but are not limited to, N,N-dimethylhydroxylamine, N,N-diethylhydroxylamine, N-methyl N-ethylhydroxylamine, N,N-dipropylhydroxylamine, N,N,-dibutylhydroxylamine, N-ethyl, N-tolylhydroxylamine, N-N-dibenzylhydroxylamine and the like, and the water soluble salts thereof, and mixtures thereof. A preferred N,N-dihydrocarbylhydroxylamine for use in this invention is N,N-diethylhydroxylamine.

Specific examples of N-hydrocarbylhydroxylamines suitable for use in this invention include, but are not limited to, N-methylhydroxylamine, N-ethylhydroxylamine, N-propylhydroxylamine, N-butylhydroxylamine, N-isopropylhydroxylamine, N-cyclohexylhydroxylamine, N-tert-butylhydroxylamine, N-benzylhydroxylamine, and the like, and mixtures thereof. A preferred N-hydrocarbylhydroxylamine for use in this invention is N-isopropylhydroxylamine.

The dosage amounts of the corrosion inhibiting compositions of the present invention is not per se critical to the invention and can be readily determined by one of ordinary skill in the art by conventional methods. In general, approximately 3 parts per million of hydroxylamine or an equivalent amount of a derivative is needed to remove each part per million of oxygen. Accordingly, an effective dosage amount is relative to the amount of dissolved oxygen in the system to be treated. Normal dosages are in the range of from 0.001 ppm to 500 ppm (as hydroxylamine), preferably from 0.01 to 50 ppm and most preferably from 0.02 to 25 ppm.

The ratios of N,N-dihydrocarbylhydroxylamine to N-hydrocarbylhydroxylamine can vary widely depending on the nature of the system being treated and the relative concentration of dissolved oxygen in the high temperature and low temperature areas of the boiler-steam condensate system. In general the ratio is from 1:50 to 50:1, preferably 1:10 to 10:1 and most preferably 1:1 N,N-dihydrocarbylhydroxylamine:N-hydrocarbylhydroxylamine on a weight basis.

The corrosion inhibiting compositions of this invention may be used in combination with other boiler treatment agents including other corrosion inhibitors or oxygen scavengers such as neutralizing amines, hydrazine, sodium sulfite, as well as other known dispersants, chelants, scale inhibitors, and the like, and mixtures thereof.

A particularly preferred embodiment comprises the combination of a neutralizing amine with the N,N-dihydrocarbylhydroxylamines and N-hydrocarbylhydroxylamines. The ratio of neutralizing amine to N,N-dihydrocarbylhydroxylamines is generally in the range of from 1:10 to 100:1 on a weight basis.

Without further elaboration, it is believed that one of ordinary skill in the art, using the preceding detailed description, can utilize the present invention to its fullest extent.

The following examples are provided to illustrate the invention in accordance with the principles of this invention, but are not to be construed as limiting the invention in any way except as indicated in the appended claims. All parts and percentages are by weight unless otherwise indicated.

EXAMPLE 1

The oxygen scavenging activity of the water-soluble N,N-dihydrocarbylhydroxylamines and N-hydrocarbylhydroxylamines of this invention were evaluated under simulated boiler feedwater conditions. The apparatus used for this evaluation is depicted schematically in FIG. 1. The apparatus (10) comprises a peristaltic pump (11) which is used for circulating water throughout the system, pump inlet tubing (12) and pump outlet tubing (13). A polyethylene fill-bottle (14) is connected with the inlet tubing and is used to feed system water into the apparatus. A valve (15), which may be selectively opened and closed, is provided between the fill-bottle and the inlet tubing and is used to control flow therebetween. A temperature measurement chamber (16) is positioned within the pump inlet tubing and contains a thermometer (17) used for monitoring the water temperature. The system water is drawn through the inlet tubing, into the pump, and then is pumped via the pump outlet tubing into a glass sampling chamber (18). The sampling chamber contains a pH probe (19) and a dissolved oxygen probe (20). The pH probe is operably connected to a pH meter (21) used for displaying and monitoring the system water pH; and the dissolved oxygen probe is operably connected to a dissolved oxygen meter (22) used for displaying and monitoring the system water dissolved oxygen level, as well as to a recorder (23) used for continuously recording the dissolved oxygen level in the system water. Tubing (24) is provided for directing system water from the glass sampling chamber to the one liter stainless steel preheat reactor (25), known in the laboratory as a "Parr vessel." A glass chemical inlet chamber (26) is positioned within the tubing and may be fitted with a rubber septum (not shown) through which a chemical solution of oxygen scavenger may be injected. The preheat reactor contains a heating element (not shown) which may be activated to preheat the system water. Water forced out of the preheat reactor by operation of the pump is directed through tubing (27) to a two liter stainless steel heating reactor (28) where the system water is heated to its highest temperature. A heating element and a thermostat (not shown) are provided for maintaining the water temperature in the heating reactor relatively constant. The water from the heating reactor passes through tubing (29) into a water cooled heat exchanger (30) which cools the system water to a range of about 55° F. to 60° F. System water from the heat exchanger is then recirculated into the pump inlet tubing. Thus, while the system water may be heated to elevated temperatures in the preheat reactor and heating reactor, the recirculated water passing through the pump and into the sampling chamber may be kept at a relatively constant temperature conducive to accurate probe operation. The full capacity of the apparatus is about 4.5 liters while the pumping rate of the pump is about 0.30 to 0.35 liters per minute.

The oxygen scavenging activities of N,N-dihydrocarbylhydroxylamine and N-hydrocarbylhydroxylamine were investigated in system water conditions of 194° F. and pH 8.5. In each run distilled water saturated with oxygen (about 8 to 9 ppm) and adjusted to the requisite pH with sodium hydroxide, was fed into the system through the polyethylene fill-bottle. The system was filled to its capacity with water to the substantial exclusion of air, and the water was heated using the preheat reactor and heating reactor until the steady state was achieved at which the temperature of system water leaving the heating reactor, as controlled by the thermostat therein, was 194° F., and the temperature of the system water leaving the heat exchanger as measured by thermometer was from about 55° F. to 60° F. During this period, gas was allowed to exit from the system through the fill-bottle and the chemical inlet chamber; and the dissolved oxygen level in the circulating water was allowed to equilibrate. Recirculation continued in each run until the oxygen level in the system water remained constant for at least 30 minutes. Once the initial oxygen reading was established, the system was effectively closed to the atmosphere and the oxygen scavenger was injected through a rubber septum fitted in the chemical inlet chamber. Recycling continued for 30 minutes, during which tine the oxygen level in the sampling chamber was monitored. The results are shown in Table 1 below.

TABLE 1

| Hydroxylamine | Time, Minutes | | | | | | |
|---|---|---|---|---|---|---|---|
| | 0 | 5 | 10 | 15 | 20 | 25 | 30 |
| N-Methyl | 3.3* | 1.8 | 1.0 | 0.7 | 0.5 | 0.4 | 0.3 |
| N—$C_2H_5$ | 4.1 | 2.5 | 1.6 | 1.1 | 0.8 | 0.6 | 0.4 |
| N—$C_3H_7$ | 5.0 | 3.0 | 2.0 | 1.3 | 1.0 | 0.7 | 0.5 |
| N-(i-$C_3H_7$) | 4.8 | 2.2 | 1.1 | 0.7 | 0.5 | 0.4 | 0.3 |
| N-(t-$C_4H_9$) | 4.8 | 3.4 | 2.5 | 2.0 | 1.6 | 1.3 | 1.0 |
| N-Cyclohexyl | 4.0 | 3.2 | 2.3 | 1.6 | 1.1 | 0.7 | 0.5 |
| N,N-di-$CH_3$ | 3.7 | 3.3 | 2.9 | 2.6 | 2.4 | 2.2 | 2.0 |
| N,N-di-$C_2H_5$ | 5.1 | 4.3 | 3.6 | 3.1 | 2.7 | 2.5 | 2.4 |
| N,N-di-benzyl | 4.7 | 2.9 | 2.5 | 2.2 | 2.0 | 1.9 | 1.8 |

*ppm $O_2$

The results show that the N-hydrocarbylhydroxylamines are significantly faster oxygen scavengers compared to the N,N-dihydrocarbylhydroxylamines under the testing conditions.

EXAMPLE 2

Thermal stability of hydrocarbylhydroxylamine compounds was investigated under boiler temperatures using the Parr pressure vessel. Approximately 1000 ml of a 1000 ppm solution of the compound in distilled water was placed into a 2-liter Parr vessel. The pH of the solution was adjusted to 9 using sodium hydroxide. The vessel was blanketed with nitrogen and was then heated at 200 psig (388° F.) for two hours, terminated, cooled and sampled. The concentration of the additive before and after autoclaving was analyzed by using gas chromatography. Experimental results are shown below.

TABLE 2

| ADDITIVE | Concentration (ppm) Before and After Autoclaving at 200 psig (388° F.) | | Decomposition, % |
|---|---|---|---|
| | Before | After | |
| N,N-Diethyl-hydroxylamine | 1000 | 1000 | 0 |
| N-Ethyl-hydroxylamine | 1000 | 0 | 100 |
| N-Propyl-hydroxylamine | 1000 | 0 | 100 |
| N-Isopropyl-hydroxylamine | 1000 | 630 | 37 |

As shown in Table 2, the N-hydrocarbylhydroxylamines tested are less stable than N,N-diethylhydroxylamine which is a N,N-dihydrocarbylhydroxylamine at high temperatures.

EXAMPLE 3

Steam lines and steam condensate lines of boiler systems are subject to corrosion which is very difficult to control. This corrosion is caused by the presence of two impurities in the steam, namely, carbon dioxide and oxygen.

Volatile neutralizing amines, such as morpholine, diethylaminoethanol and cyclohexylamine, have been used as steam line treatments. However, the use of neutralizing amines can control carbon dioxide only. They are unable to provide protection against oxygen corrosion.

For controlling oxygen corrosion in boiler systems, sodium sulfite and hydrazine have been commonly used. Unfortunately, these compounds are non-volatile and do not prevent oxygen corrosion in steam lines. These treatment programs therefore have not been completely satisfactory.

We found that hydroxylamine compounds are not only effective oxygen scavengers, but also volatile, thus capable of protecting the entire boiler circuit (i.e. water and steam).

The volatility of a boiler water treatment in a steam generating system is termed vapor-liquid distribution ratio. The vapor-liquid distribution ratio of the hydroxylamine compounds are illustrated in Table 3. The experimental procedure for determining the vapor-liquid distribution ratio is described in Materials Performance, Vol. 16, No. 5, pages 21–23 (1977).

TABLE 3

| Additive | Vapor-Liquid Distribution Ratio |
|---|---|
| Standard Neutralizing Amines: | |
| Morpholine | 0.48 |
| Diethylaminoethanol | 1.45 |
| Cyclohexylamine | 2.60 |
| Standard Boiler Oxygen | |

TABLE 3-continued

| Additive | Vapor-Liquid Distribution Ratio |
|---|---|
| Scavengers: | |
| Sodium Sulfite | 0.00 |
| Hydrazine | 0.08 |
| Hydroxylamine Compounds: | |
| N-Methylhydroxylamine | 3.30 |
| N,N-Diethylhydroxylamine | 1.26 |
| N-Isopropylhydroxylamine | 1.20 |
| N-tert-Butylhydroxylamine | 1.30 |
| N-Cyclohexylhydroxylamine | 1.30 |

EXAMPLE 4

A mixture of N,N-diethylhydroxylamine and N-isopropylhydroxylamine (1:1 ratio by weight) was fed to the deaerator storage sections of the 600 psig and 1500 psig boiler systems at a pulp and paper mill. The treatment was added at a rate of 12 ppm active. It reduced oxygen levels in the feedwater to 1.5–3 ppb from 3–6 ppb with a conventional oxygen scavenger program. The mixture of N,N-diethylhydroxylamine and N-isopropylhydroxylamine reduced iron and copper levels in the feedwater, steam and condensate lines.

We claim:

1. A method of inhibiting corrosion in boiler-steam condensate systems having low temperature areas and high temperature areas comprising adding to the system water-soluble N,N-dihydrocarbylhydroxylamine and N-hydrocarbylhydroxylamine in amounts effective to inhibit corrosion and wherein the weight ratio of N,N-dihydrocarbylhydroxylamine to N-hydrocarbylhydroxylamine is from 50:1 to 1:50 respectively.

2. A method according to claim 1 wherein the N,N-dihydrocarbylhydroxylamine is N,N-diethylhydroxylamine.

3. A method according to claim 1 wherein the N-hydrocarbylhydroxylamine is N-isopropylhydroxylamine.

4. A method according to claim 1 wherein the hydroxylamines are added in combination with one or more neutralizing amines.

5. A method according to claim 4 wherein the neutralizing amines are selected from the group consisting of cyclohexylamine, morpholine, diethylaminoethanol, dimethylpropanolamine and 2-amino-2-methyl-1-propanol.

6. A corrosion inhibiting composition according to claim 1 wherein the water-soluble N,N-dihydrocarbylhydroxyamine and N-hydrocarbylhydroxylamine are in a weight ratio within the range from about 10:1 to about 1:10.

7. A corrosion inhibiting composition according to claim 6 wherein the N-hydrocarbylhydroxylamine is N-isopropylhydroxylamine.

8. A corrosion inhibiting composition according to claim 1 wherein the water soluble, N,N-dihydrocarbylhydroxylamine and N-hydrocarbylhydroxylamine are in the ratio of approximately 1:1 by weight.

9. A corrosion inhibiting composition for boilersteam condensate systems comprising water-soluble N,N-dihydrocarbylhydroxylamine, N-hydrocarbylhydroxylamine and a neutralizing amine; the weight ratio of the N,N-dihydrocarbylhydroxylamine component to the N-hydrocarbylhydroxylamine component being between about 50:1 to about 1:50, and the weight ratio of the N,N-dihydrocarbylhydroxylamine component to the neturalizing amine component being between about 10:1 to about 1:100.

10. A corrosion inhibiting composition according to claim 9 the neutralizing amine is selected from the group consisting of cyclohexylamine, morpholine, diethylaminoethanol, dimethylpropanolamine and 2-amino-2-methyl-1-propanol.

* * * * *